W. J. CHISM.
TRACTION DEVICE.
APPLICATION FILED APR. 12, 1919.
1,343,658.
Patented June 15, 1920.
3 SHEETS—SHEET 1.
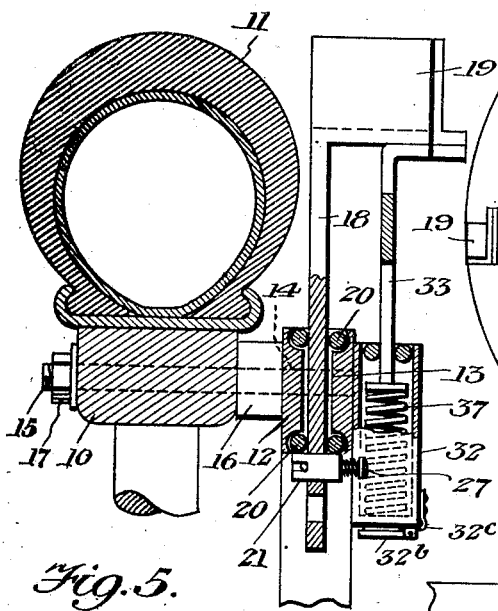
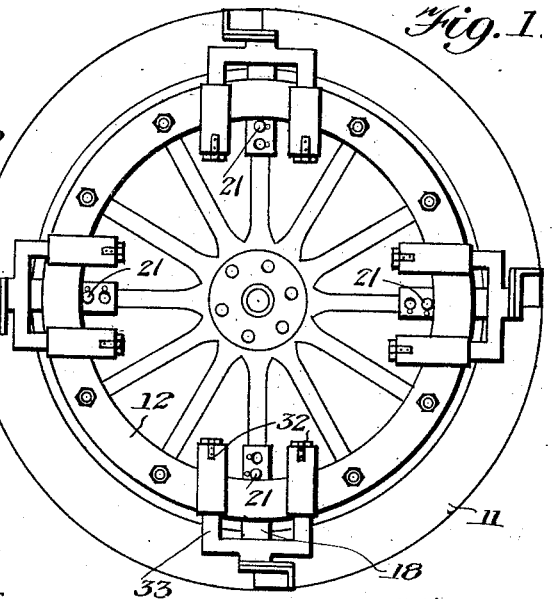
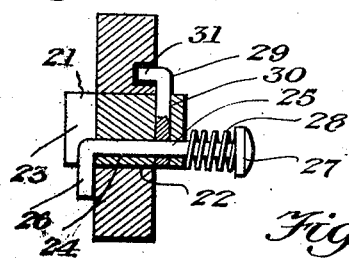
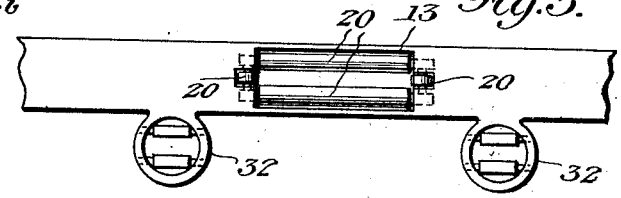
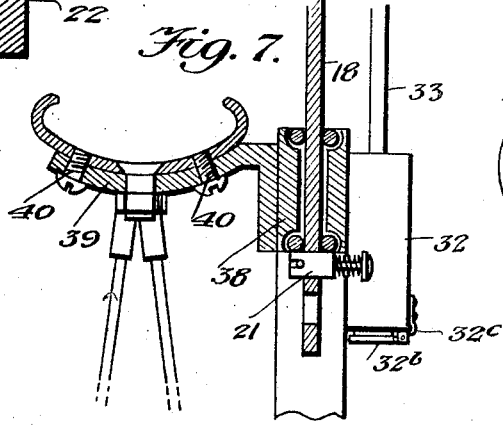
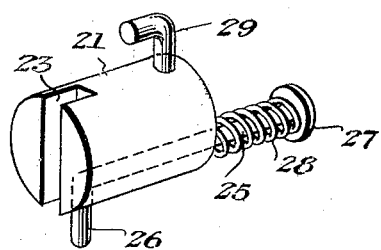
INVENTOR.
W. J. Chism
BY
Victor J. Evans ATTORNEY.

W. J. CHISM.
TRACTION DEVICE.
APPLICATION FILED APR. 12, 1919.

1,343,658.

Patented June 15, 1920.
3 SHEETS—SHEET 2.

INVENTOR.
W. J. Chism
BY
Victor J. Evans
ATTORNEY.

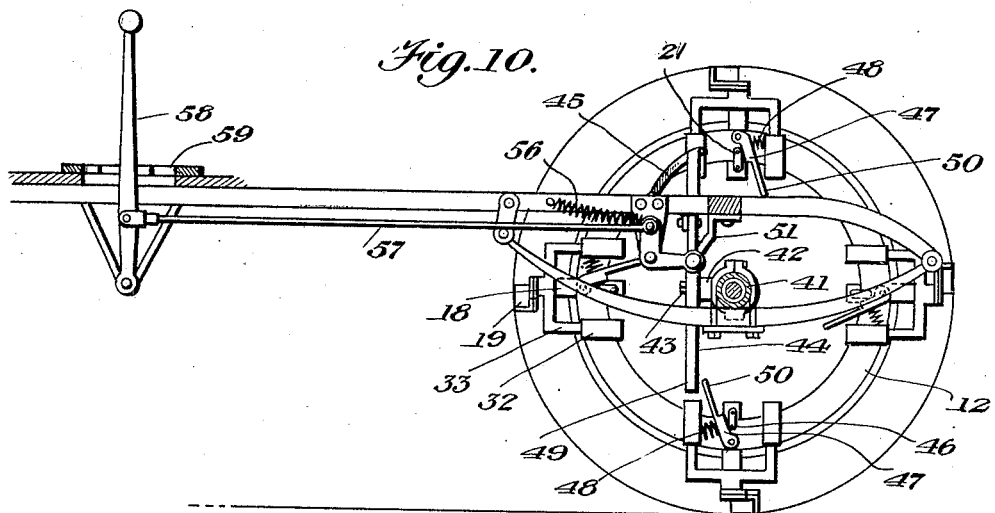
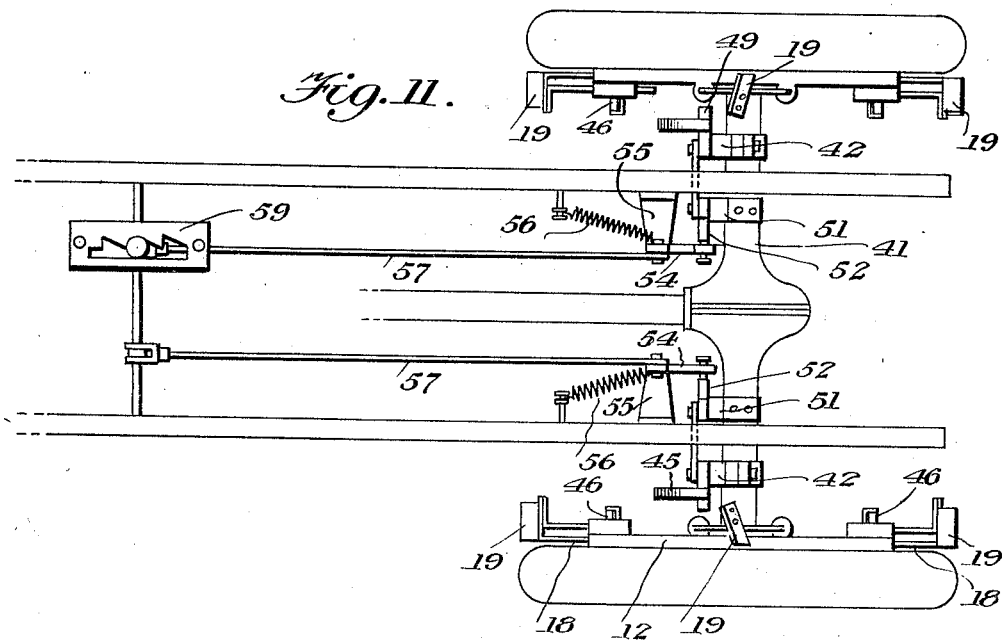

UNITED STATES PATENT OFFICE.

WILLIAM J. CHISM, OF CLEVELAND, OHIO.

TRACTION DEVICE.

1,343,658.  Specification of Letters Patent.  Patented June 15, 1920.

Application filed April 12, 1919. Serial No. 289,550.

*To all whom it may concern:*

Be it known that I, WILLIAM J. CHISM, a subject of the King of Great Britain, residing at Cleveland, in the county of Cuyahoga and State of Ohio, have invented new and useful Improvements in Traction Devices, of which the following is a specification.

This invention relates to traction devices and aims to provide means which may be removably secured to the wheels of a motor operated or other vehicle, to increase the traction qualities, the device being especially useful in traveling through mud or sand.

The object of the invention is the provision of a device of this character, which may be removably secured upon a vehicle wheel in a manner to present no hindrance to travel over ordinary roads, the device being so constructed as to yield upon contact with a stone or other raised surface, so that jar or shock will not be imparted to the vehicle.

Another object of the invention is the provision of a device, which in addition to increasing the traction qualities of the wheel for the purpose of propelling the vehicle, either forward or backward, will act to prevent side skidding and thereby increase the safety of the vehicle.

A further object is to provide means for controlling the device from the driver's seat, so that the mud paddles may be brought into and out of operative position without leaving the vehicle, enabling the driver to use the device upon muddy or sandy roads and to conveniently draw the device inward from contact with the ground.

A still further object is the provision of a device which is simple, strong and durable in construction, being manufactured preferably of rolled metal and bent into shape, thereby eliminating the danger of breakage due to air holes or other defects sometimes found in molded metal.

Other objects and advantages of the invention will appear as the following description is read in connection with the accompanying drawings.

In the drawings:

Figure 1 is a side elevation of the inner face of a vehicle wheel, having the invention applied thereto.

Fig. 2 is an enlarged fragmentary cross sectional view.

Fig. 3 is an enlarged fragmentary edge view, illustrating a portion of the ring used for securing the invention to the wheel.

Fig. 5 is an enlarged detail sectional view showing the stop for locking the paddle in position.

Fig. 6 is a detail perspective view of the stop detached.

Fig. 7 is a detail sectional view of a modified form of means for securing the paddle to the wheel.

Fig. 10 is a longitudinal sectional view showing a sufficient portion of a motor vehicle to illustrate the application of the traction paddle controlling means.

Fig. 11 is a rear elevation of the same.

Figure 4:
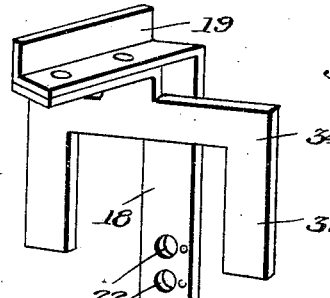
Fig. 4 is a detail perspective view showing the traction paddle and the yoke carried thereby.
Figure 8:
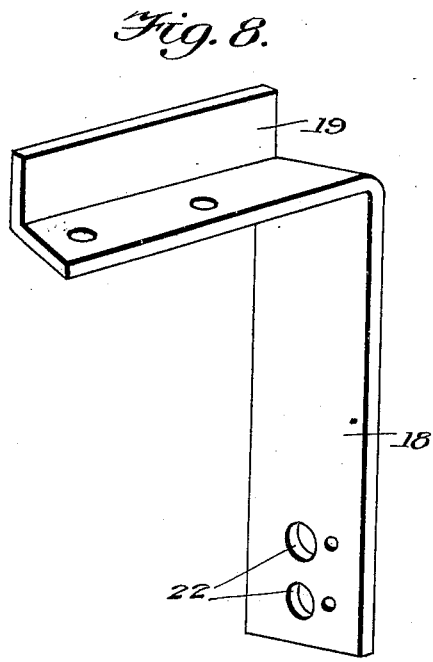
Fig. 8 is a detail perspective view of the traction paddle separated from the yoke.
Figure 9:
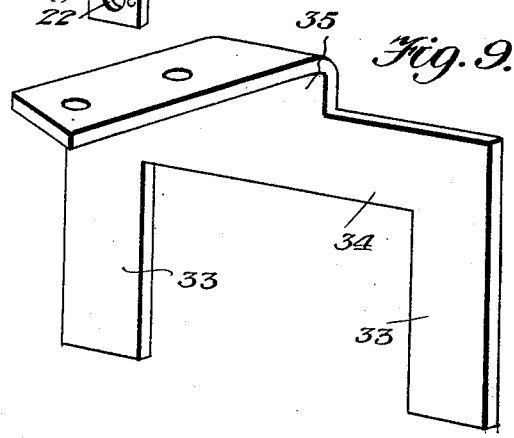
Fig. 9 is a similar view of the yoke.
Figure 12:
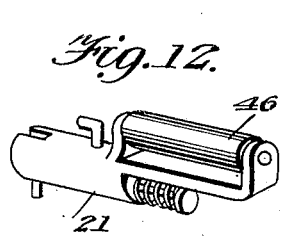
Fig. 12 is a view similar to Fig. 5 showing the stop used in connection with the structure illustrated in Figs. 10 and 11.
Figure 13:
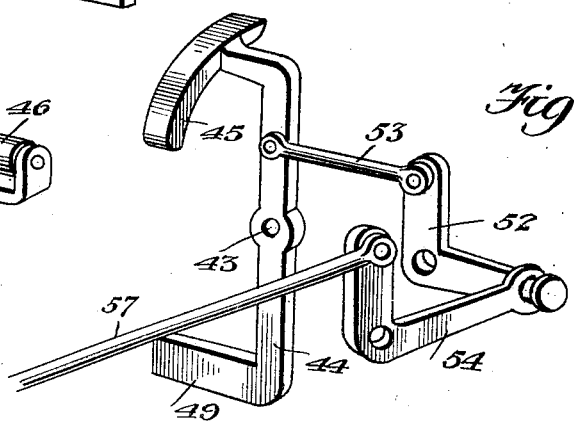
Fig. 13 is a perspective view of the pivoted cam frame.
Figures 14, 15:
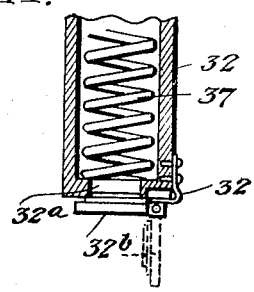
Fig. 14 is a fragmentary section through the lower end of the hollow cushioning member.
Fig. 15 is a bottom view of the same.

Referring in detail to the drawings, the numeral 10 indicates the felly of a vehicle wheel, such as is commonly used upon automobiles, trucks, and the like. This wheel as shown, has applied thereto a tire 11 of the pneumatic type, but it is obvious that a solid tire may be substituted. The invention is shown as applied to one face of the wheel, but may be applied to either face of both wheels, as desired. To accomplish this there is secured to the face of the felly 10 an annulus 12, in the form of a flat metal ring. This ring has formed thereon transverse sockets 13, which extend radially through the ring for the reception of paddles to be later described. The ring 12 is provided with a plurality of openings 14, for the passage of bolts 15, and positioned upon these bolts between the ring and the felly are spacing washers 16. The bolts 15 extend through the felly 10, the ring 12 and the washer 16 and are threaded upon each end for the reception of suitable nuts 17. These nuts are indicated at 17 and serve to hold the ring in position, spaced from the wheel. Any number of sockets 13 may be provided in the ring 12, the number depending upon the number of paddles to be used. The paddles, which are preferably formed of rolled metal, are bent into shape to provide a shank 18 and a blade 19, the latter consisting of a substantially L shaped member disposed at right angles to the shank, but arranged so that when applied to the wheel the blade will extend at an acute angle of approximately 35 degrees with respect to the face of said wheel, so as to prevent the vehicle from skidding.

Each of the sockets 13 is provided at both their side and end faces with anti-friction rollers 20, in order that the shank 18 of the paddle may have a free sliding movement therein. The shank is held in the socket through the medium of a stop 21, which may be placed in any one of a plurality of openings 22, provided in the shank. This stop consists of a cylindrical member adapted to snugly fit the openings 22 and is provided at one end with a diametrically arranged groove 23, which communicates with the longitudinally disposed opening 24, located to one side of the center of the stop. Mounted within the opening 24 is a key 25, one end of which is bent at right angles, as shown at 26, while the opposite end carries a head 27. Positioned upon the shank of the key 25 between the stop 21 and the head 27, is a spring 28, the purpose of which is to force the end 26 of the said key into the slot 23 when the said end and slot are alined.

By pushing the key inward so as to disengage the end 26 from the groove 23, the said key may be rotated 180 degrees and the end 26 again permitted to enter the slot 23. In this position the stop 21 may be removed from the openings 22 and inserted in another opening. It may be here stated that the openings 22 are so positioned as to permit of two adjustments of the traction paddle, one of which is shown in Figs. 1 and 2, in which the paddle is in an operative position. By changing the position of the stop, the paddle may be held in retracted position so as not to come in contact with the surface over which the wheel is traveling. In order to prevent rotation of the stop 21, there is provided a rod 29, one end of which is engageable with an opening 30, provided in the stop and the opposite end, which is disposed at a right angle, is engageable with a socket 31, located adjacent each of the openings 22 in the shank 18 of the traction paddle.

Secured upon the outer face of the ring 12 and upon each side of each of the sockets 13, is a hollow member 32. This member is partly closed at one end and is provided at its opposite end with an opening which is adapted to receive one of the arms 33 of a yoke 34, which yoke extends across the sockets 13 and is provided with an extension 35 which is secured to the blade 19 of the traction paddle. This acts as a reinforcement for the blade 19 and serves to prevent the said blade from bending inwardly. Anti-friction rollers are also provided in the members 32 for contact with the arms 33 of the yoke and permit of free movement of the said arms within the members. The inner extremities of the arms 33 bear upon the coil springs 37, which are located within the members 32 and serve to normally force the paddle outward, so as to contact with the surface over which the wheel is traveling, while the stop 21 limits such outward movement. The bottom of the hollow member 32 is provided with an opening $32^a$, which is normally closed by means of a hinged closure $32^b$, a spring $32^c$ serving to hold the closure in either an open or closed position. The purpose of this is to permit of water being run through the hollow member to clean out dirt or mud collected.

In Fig. 7 there is illustrated a modified form of the invention in which an annulus or ring, indicated at 38, is provided with laterally extending fingers 39. These fingers are shaped to conform with the inner periphery of the rim or felly of a wheel with wire spokes, to which they are secured through the medium of bolts 40. This construction also permits of the use of the traction device upon motorcycles having either metal or wooden rims.

The device is also capable of use upon the wheels of vehicles of various descriptions, such as automobiles, trucks, motorcycles and the like. In applying it to vehicles of different types, it may be found necessary to make minor changes in the method of securing the annulus or rings to the wheels and the right is herein reserved to make these and other changes that properly fall within the scope of the appended claims.

In order to provide for the use of the traction device when necessary and to move the said device to an inoperative position when traveling over good roads, without leaving the vehicle and manually adjusting the paddles, there is secured to the housing 41 of the rear axle of the vehicle a bracket 42. Pivotally mounted upon this bracket, as shown at 43, is a frame 44, the pivotal mounting of the frame permitting of the movement of either end at a time toward or away from the wheel. One end of the frame carries an inclined cam member 45, which is adapted to be moved in the path of the stop 21 for contact therewith, which contact will cause the stop to move inward toward the hub of the wheel carrying inward the traction paddles, so as to prevent their contact with the ground. With the use of the frame 44 it is preferred to provide the stop 21 with a roller 46, so as to reduce friction to more easily move the paddle inward. When moved to its inner or inoperative position, the paddle is held through the medium of a latch 47, which is pivotally mounted upon the ring or annulus 12 and is adapted to be forced in behind the stop 21, through the medium of a spring 48 to release the paddle so as to permit of its movement outward to an operative position under the influence of the spring 37. The opposite end 49 of the frame 44 is brought into the path of the extended end 50 of the latch 47, swinging the latch upon its pivot against the action of the spring and releasing the stop 21. These operations, of course, occur successively as the wheel is rotated during the movement of the vehicle.

Pivotally mounted upon a bracket 51, secured to some convenient portion of the vehicle, is a bell crank 52, one arm of which is connected to the frame 44 through the medium of a link 53. The other arm of the bell crank is connected to a bell crank 54, which is pivoted upon a bracket 55, so as to operate at right angles to the bell crank 52. The bell crank 54 is spring actuated through the medium of a spring 56 and has connected thereto one end of a rod 57, the opposite end of this rod being connected to an operating lever 58. The lever 58 is so mounted as to be within convenient reach of the driver of the vehicle and is engageable in a notched plate 59. The plate 59 is provided with three notches, one end notch being for the purpose of holding the lever in position to throw the cam 45 into the path of the stops 21 to retract the paddles. While the notch at the opposite end of the plate positions the lever to throw the end 49 of the frame 44 in the path of the latches 47 to release the stops, the intermediate notch holds the lever in position to move the frame 44 to an intermediate or neutral position, in which both the cam 45 and the end 49 of the frame is out of the path of the stops and latches.

The above described mechanism is illustrative of one form of the traction device controlling means and may be varied to suit different conditions and different vehicles, so that it is not the purpose of the present application to limit the invention to the particular means shown and described.

Having described the invention, what is claimed is:

1. The combination with a vehicle wheel, of a traction member, means for yieldingly mounting the member upon the wheel in a manner to permit of a radial sliding movement, means including a laterally movable cam member controlled by the driver of the vehicle and movable into and out of the path of the traction member for moving the latter to an inoperative position, automatically operated means for holding the said member in such position and means carried by the member for releasing the holding means.

2. The combination with a vehicle wheel, of a traction member, means for yieldingly mounting the member upon the wheel in a manner to permit of a radial sliding movement, means including a cam member controlled by the driver of the vehicle and movable into and out of the path of the traction member for moving the latter to an inoperative position, a spring actuated latch pivotally mounted upon the vehicle wheel and adapted to be automatically moved into the path of the traction member for holding said member in such inoperative position and means connected to the cam member for releasing the holding means.

3. The combination with a vehicle wheel, of a traction member, means for yieldingly mounting the member upon the wheel in a manner to permit of a radial sliding movement, means including a cam member controlled by the driver of the vehicle and movable into and out of the path of the traction member for moving the latter to an inoperative position, a spring actuated latch mounted upon the vehicle wheel and adapted to be automatically moved into the path of the traction member for holding said member in an inoperative position and an extension carried by the cam member and engageable with the spring actuated latch for releasing the latter to release the traction member.

In testimony whereof I affix my signature.

WILLIAM J. CHISM.